United States Patent [19]

Thornton

[11] Patent Number: 4,687,372

[45] Date of Patent: Aug. 18, 1987

[54] TOXIC WASTE DRAIN SYSTEM AND METHOD

[76] Inventor: Ken O. Thornton, 215 E. Grimes St., Polk City, Iowa 50226

[21] Appl. No.: 823,044

[22] Filed: Jan. 27, 1986

[51] Int. Cl.⁴ .......................... B09B 1/00; E02D 5/18; E02B 11/00
[52] U.S. Cl. .................................... 405/128; 405/36; 405/267; 210/170; 210/747
[58] Field of Search .................................. 405/36-38, 405/43, 45, 50-55, 57, 128, 129, 258, 266, 267, 270; 210/170, 747; 252/633

[56] References Cited

U.S. PATENT DOCUMENTS

| | | | |
|---|---|---|---|
| 1,760,314 | 5/1930 | Murrey | 405/51 |
| 2,622,683 | 12/1952 | Silitch et al. | 405/36 X |
| 3,705,851 | 12/1972 | Brauer | 405/36 X |
| 3,759,044 | 9/1973 | Caron et al. | 405/267 |
| 4,112,690 | 9/1978 | Hosoya et al. | 405/55 X |
| 4,273,475 | 6/1981 | Fuller | 405/267 X |
| 4,279,547 | 7/1981 | Clem | 405/258 |
| 4,288,174 | 9/1981 | Laws | 405/43 |
| 4,345,581 | 8/1982 | Shacher | 126/415 |
| 4,350,461 | 9/1982 | Valiga et al. | 405/128 |
| 4,352,601 | 10/1982 | Valiga et al. | 405/270 |
| 4,358,221 | 11/1982 | Wickberg | 405/128 |
| 4,430,021 | 2/1984 | Wagner et al. | 405/129 |
| 4,448,690 | 5/1984 | Maphis | 210/609 |
| 4,453,857 | 6/1984 | Serra et al. | 405/128 |
| 4,543,013 | 9/1985 | Wagner et al. | 405/128 |
| 4,543,016 | 9/1985 | Tallard | 405/129 X |

FOREIGN PATENT DOCUMENTS

| | | | |
|---|---|---|---|
| 2524351 | 10/1983 | France | 405/128 |
| 170592 | 10/1983 | Japan | 405/128 |

*Primary Examiner*—Cornelius J. Husar
*Assistant Examiner*—Nancy J. Stodola
*Attorney, Agent, or Firm*—Zarley, McKee, Thomte, Voorhees & Sease

[57] ABSTRACT

A method and system of storing and containing existing toxic waste dump sites, to prevent leakage and seepage from the waste site. It involves ascertaining the soil characteristics to determine the moisture impervious layer depth for the soil surrounding the pit site, digging a perimeter trench around the dump site to a depth at least equal to the moisture impervious layer, filling the perimeter trench with a substantially moisture impervious material, placing a well casing within the area defined by the perimeter trench, adjacent to the pit, and placing a drain line below the bottom of the toxic waste site dump pit in fluid communication with the well casing. As a result of this alteration of the water drainage profile within the surrounding soil, the risk of seepage, leakage and drainage of toxic waste into the aquifers is lessened.

14 Claims, 1 Drawing Figure

TOXIC WASTE DRAIN SYSTEM AND METHOD

BACKGROUND OF THE INVENTION

Toxic waste dump sites are a matter of continuing concern in these times of ecological awareness. Moreover, with the notorious publicity of many famous waste dump site disasters, there is a continuing need for development of more efficient and safe waste sites. There are now existing such waste sites in every single state of the United States. Each of these represents a potential health hazzard.

One of the primary hazzards of existing waste sites is the seepage of toxic waste down through the bottom of the existing waste pool such that it drains into the aquifers, which are of course the horizontal water flow lines at subsurface levels. Once waste begins to leak or seep into the aquifer, it then has the potential of contaminating the natural water supply, resulting in serious hazzards and possibly necessitating water shut-downs for miles around. Moreover, there now exist many toxic waste dump site pools which were built at a time when the soil historesus of the surrounding soil was not well-known, with the result being that the dump site, while believed safe was in fact not.

Accordingly, it is a primary objective of the present invention to develop a system and method which can be used to shore up existing waste dump sites, eliminating substantially the risk of seepage and leakage into the surrounding water flow aquifers.

It is yet another objective of the present invention to provide the above method by using only conventional and available materials.

It is an even further objective of the present invention to provide the above referred to method and objectives in a manner which does not require disturbance of the existing stored pool of waste materials, thus reducing significantly the risk of hazzardous contamination during the very process of treatment in order to enhance containment.

The method and means of accomplishing each of the above objectives will become apparent from the detailed description of the invention which follows hereinafter.

SUMMARY OF THE INVENTION

In accordance with this invention, a method and system is provided for sealing containment of hazzard waste in existing pool sites. A perimeter trench is dug around an existing toxic waste dump site, with the trench being dug to a depth which is at least to the moisture impervious barrier level of the surrounding soil material. The trench is filled with a generally moisture impervious material such as bentonite, and a well bore hole is placed within the perimeter trench adjacent to the toxic waste pool with at least one horizontal drain line in communication with the well hole, spaced below the bottom of the waste pit.

DETAILED DESCRIPTION OF THE INVENTION

Figure 1:
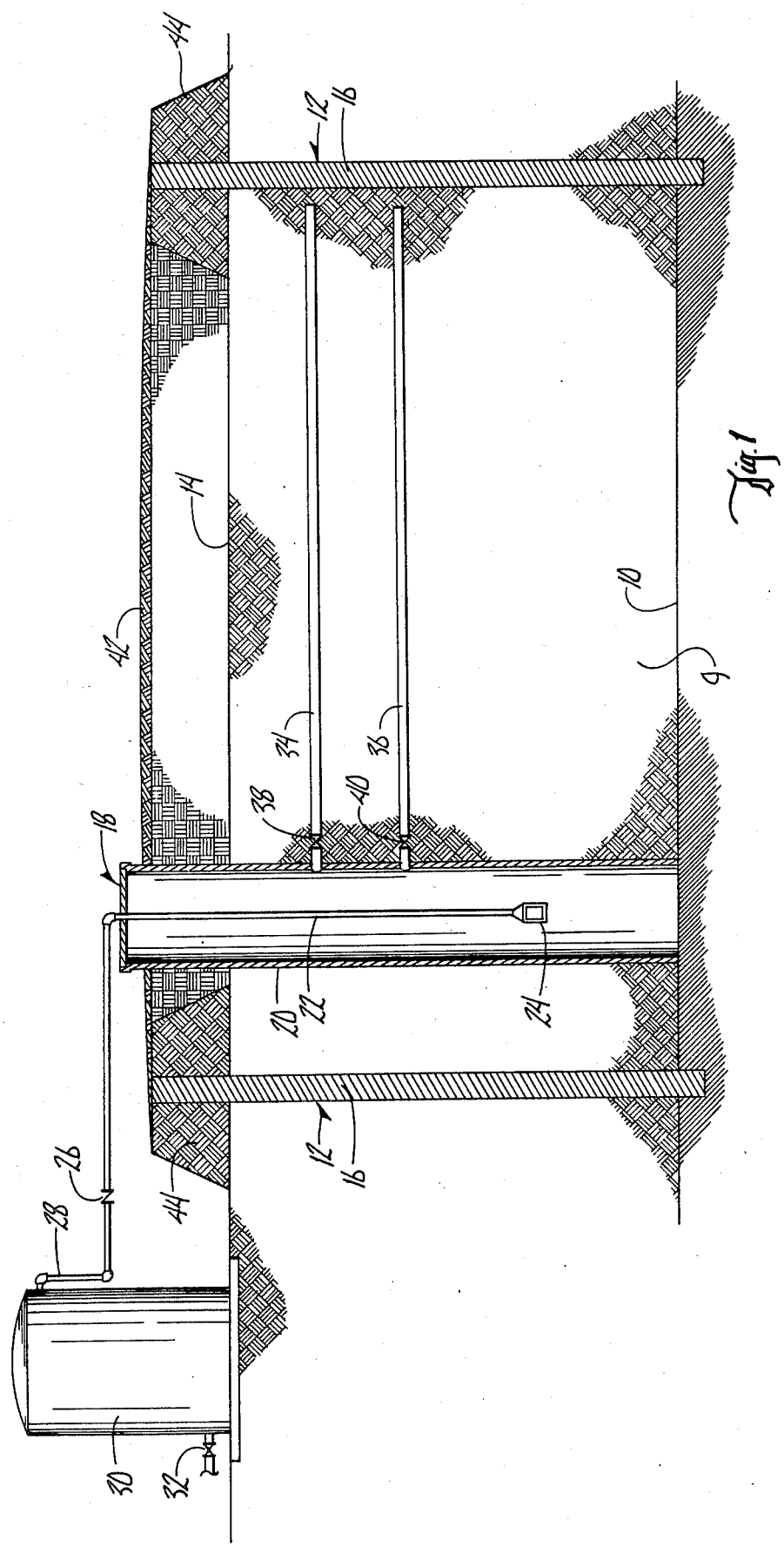
FIG. 1 is a schematic and elevated view of the system of this invention.

This invention makes use of soil physics, and involves the knowledge of the same in a determination of the water drainage profile within any given soil material. An analysis of the soil, referred to as the soil historesus and/or percolation rate, allows one to determine for any given soil profile the depth level of the impermeable barrier layer, referred to in the drawing generally as 10. The impermeable barrier 10 is defined as a stratum of soil having such properties as to slow the water perculation rate by 80% of other horiziontal stratum. This depth will vary for differing soil samples, depending upon the nature and characteristic content of the soil sample, the compaction of the soil sample, porosity of the soil sample, etc. It is, however, an easily ascertainable determination by convention soil physics analysis. Such need not be described in detail herein, but generally this is done by making borings at various depths and then determining the rate of percolation of water through the boring. At the level at which percolation is no longer possible, begins the moisture impermeable barrier layer.

Once the moisture impermeable barrier layer 10 is determined, a perimeter trench 12 is dug completely surrounding the waste pool 9, the top surface of which is represented by line 14 in FIG. 1. Perimeter trench 12, as can be seen, is dug from the top or ground level 14 all the way down, at least to the moisture impervious layer 10. Perimeter trench 12 is filled with a moisture impervious material, which may vary considerably in content, but generally can be satisfactorily expansive clay materials such as bentonite. Other moisture impervious materials such as certain plastic films, etc. may also be employed, but most satisfactory results are used with readily available expansive materials such as bentonite clay, which are capable of expanding up to 200 times when wetted. The clay is represented at 16.

Inside of the area defined by perimeter trench 12 is a well hole 18 lined with a conventional well casing 20. Well hole 18 is dug to a depth at least equal to the moisture impervious barrier layer 10. The well hole may be located as depicted or centered in the perimeter of the control site. A well discharge line 22 is in fluid communication with submersible pump 24 at its lower end and at its upper end, which extends out through well casing 18 with a back flow preventer 26 downstream from the backflow preventor 26, is line 28 which is in fluid communication with storage tank 30. Tank 30 has a discharge valve 32. Spaced below the bottom (not depicted) of the toxic waste dump site are a pair of spaced apart dual drain lines 34 and 36, respectively. Drain lines 34 and 36 have shut- off valves 38 and 40 which allow them to be selectively placed in fluid communication with well 18.

As illustrated in FIG. 1, at the top of trench 12 on the ground surface level one may build up an upwardly sloping berm 44. Preferably the berm 44 has an upward angle of at least 45° and preferably at least 60° from the ground surface. If desired, the top of the pool, represented by the line 14 may be capped with an impervious sloping clay cap 42, and top soil may be placed on it with conventional ground vegetation to make the area look more attractive, and to facilitate excess surface water to run off. The purpose of the berm 44 is to prevent water from rain from generally draining down into the pit, and instead to drain it out away on the outer sloping edges of berm 44, or if it falls in the area within the perimeter trenches, to have such water generally be used by the growing grass vegetation, etc. In actual operation, soil profile analysis shows that the drainage has been significantly altered in the pit in the following manner.

Any moisture which does seep into the pit and drains down through its bottom will drain into drain lines 34 and 36, and if valves 38 and 40 are open, will drain into well casing 18. As well casing 18 fills, submersible pump 24 can be used to pump the now-contaminated water out and into line 22, through backflow preventor 26, into line 28, and into storage tank 30. It can be withdrawn through discharge valve 32 for further disgarding, if desired. Any contaminated moisture which leaks through the bottom of the pit, passing drain lines 34 and 36 will leak downward, but cannot pass out through the moisture impervious layer 10. It will, however, be prevented from contaminating the horizontal flow of ground water via aquifers because of the containment by the moisture impervious barrier of perimeter trench 12, enhanced by the filling of the trench with the moisture impervious materials such as bentonite 16. It therefore can be seen that there has been a significant alteration of the water run-off characteristics, i.e. the soil profile, such that the risk of contamination of natural ground water is substantially eliminated. Moreover, significantly and importantly, this system does not involve any alteration of the hazzard waste pool itself, which can be left essentially undisturbed during the insertion of the system of the present invention. It can therefore be seen that the system accomplishes at least all of its stated objectives.

What is claimed is:

1. A method of containing and storing existing toxic waste dump sites, to prevent leakage and seepage of toxic waste from existing pit-type dump sites into the surrounding area, without disturbing the existing toxic waste site of said site said method comprising:
    ascertaining from the soil vertical and horizontal hydraulic conductivity a moisture imperious layer depth for the soil surrounding the site;
    digging a perimeter trench around the dump site to a depth at least equal to the depth of soil moisture impervious layer;
    filling said trench with a substantially moisture impervious material to provide a moisture barrier perimetrically around the outside of said site;
    placing a well hole within the area defined by said perimeter trench adjacent said site;
    placing a drain line below said site and above the moisture impervious layer, said drain line being in fluid communication with said well hole; and
    providing in said well hole a pump and storage means in communications with said drain line.

2. The method of claim 1 wherein said method includes placing at least two levels of drain line below said pit.

3. The method of claim 2 wherein said method includes the step of building a berm on the ground surface above said trench to provide ground water run-off.

4. The method of claim 3 wherein said berm is sloped at an angel of 45° from the horizontal surface, upwards.

5. The method of claim 4 wherein said angle is at least 60°.

6. A contaninment system for existing toxic waste dump sites having toxic waste resting in a waste site having a top and bottom, and comprising:
    a perimeter trench in soil surrounding an existing toxic waste dump site;
    said trench having a depth in said surrounding soil at least equal to the moisture impervious layer of said surrounding soil; said trench being filled with a generally moisture impervious material;
    a well hole within the area defined by said perimeter trench adjacent said waste pit; and
    a drain line below the bottom of said dump site in fluid communication with said well hole.

7. The system of claim 6 wherein said containment system includes at least two drain lines positioned at varying depths below said dump site bottom.

8. The system of claim 6 wherein said well has a submersible pump positioned therein for pumping said waste and seepage out of said well.

9. The system of claim 8 wherein said well is in fluid communication with a storage tank.

10. The system of claim 6 wherein said trench has a built-up berm surrounding the top portion of said trench.

11. The system of claim 10 wherein said trench is filled with a clay soil material.

12. The system of claim 11 wherein the clay soil material is bentonite.

13. The system of claim 6 wherein said well is a casing well.

14. The system of claim 13 wherein said drain line is a drain tile.

* * * * *